Figure 6:
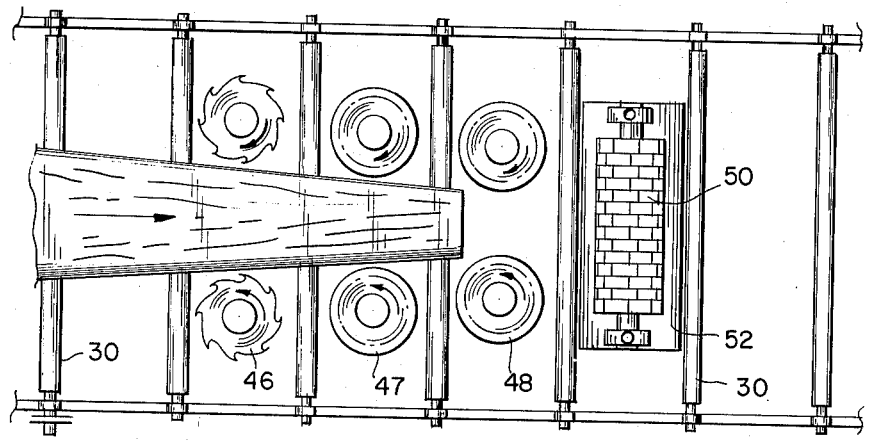

Sept. 7, 1965
J. T. GRIFFIN
3,204,675
METHOD OF SAWMILLING
Filed July 3, 1962
2 Sheets-Sheet 1
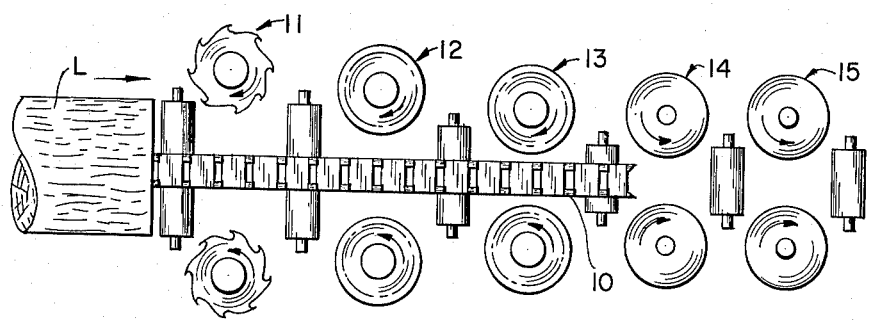
FIG. 1
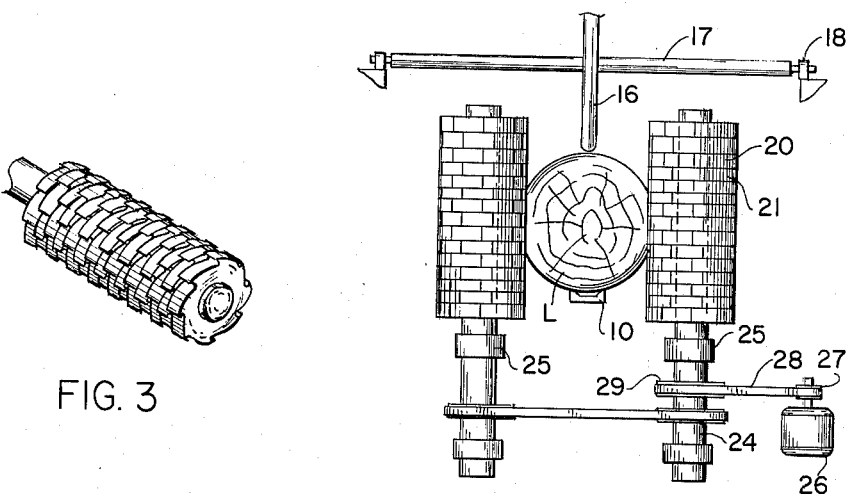
FIG. 3
FIG. 2
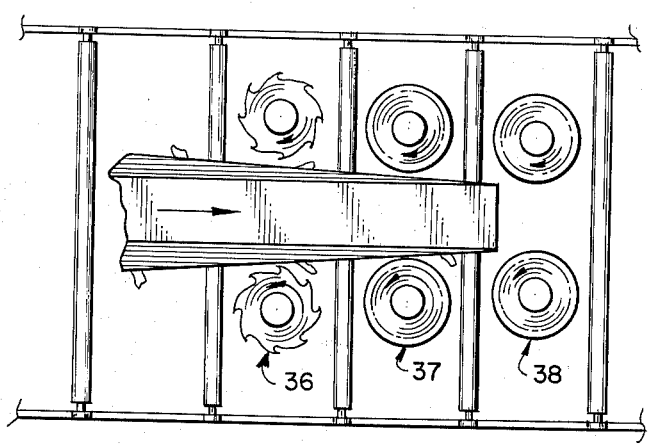
FIG. 4
INVENTOR
J. T. GRIFFIN
BY *Gates Dowell I+II*
ATTORNEY Sept. 7, 1965  J. T. GRIFFIN  3,204,675
METHOD OF SAWMILLING
Filed July 3, 1962  2 Sheets-Sheet 2

INVENTOR
J. T. GRIFFIN

BY  *[signature]*

ATTORNEY

United States Patent Office 3,204,675
Patented Sept. 7, 1965

3,204,675
METHOD OF SAWMILLING
John T. Griffin, Valdosta, Ga., assignor to
Griffwood, Inc., Lake City, Fla.
Filed July 3, 1962, Ser. No. 207,354
1 Claim. (Cl. 144—326)

This application is a continuation-in-part of my application Serial No. 179,073, filed March 12, 1962, and my application Serial No. 179,074, filed March 12, 1962, such applications being continuations-in-part of my application Serial No. 816,181, filed May 27, 1959, now Patent 3,024,820.

This invention relates to the conservation of natural resources, more particularly timber, and the economical utilization of such resources in the manufacture of lumber simultaneously with the production of usable wood chips as a by-product.

In my copending applications and said patent reference has been made to the desirability of producing usable wood chips as a by-product of sawing lumber. It has become the practice in some sawmills to use a chipping machine to reduce slabs, edgings and other waste resulting from sawmilling, to chips which are usable for making pulp. However, such a chipping machine is relatively large and expensive and personnel and equipment are required for the handling of the material to be fed thereto.

In addition, sawmilling practice involves a substantial labor cost for men performing various operations. For example, in conventional head sawing a slab is removed from the side of a log in passing the head saw. A man must attend to the removal of the slab. After the slab is cut from the log, the log is then turned 90 to 180 degrees for the removal of another slab. A second person is oftentimes required to turn the log. It will be understood that the operations of removing the slabs and turning the log are time-consuming and require the use of labor.

In some sawmills using more than one head saw the log has been sawed into a multiplicity of cants in one pass through the saw, thereby obviating the need for a log turned. However, personnel are require to remove the slabs and cants and for feeding them into the edger and chipper, if a chipper is employed.

It is an object of the present invention to provide sawing procedures by means of which logs may be converted directly into usable chips as a by-product of the production of lumber and in which the major portion of the slabs, edgings and other material which does not appear in the finished lumber is converted directly into chips from the log and its cants, thereby substantially eliminating the handling of slabs and edgings.

A further object is to provide sawing procedures by means of which substantially the entire usually debarked log is converted into lumber with the portions thereof which would normally have resulted in slabs and edgings being converted directly into usable chips and without the necessity for a separate chipping machine.

A further object is to provide procedures by means of which the sawmiller with fewer personnel than previously necessary and without a separate chipping machine may convert his debarked logs into lumber and usable chips.

Figure 7:
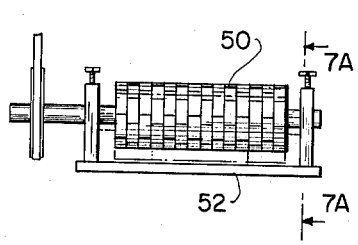
Figure 5:
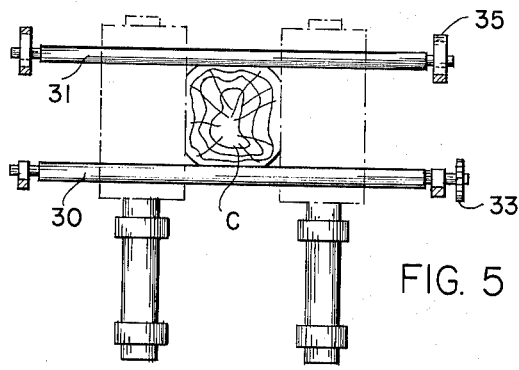
Figure 7A:
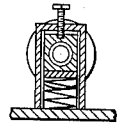
Figures 8, 9:
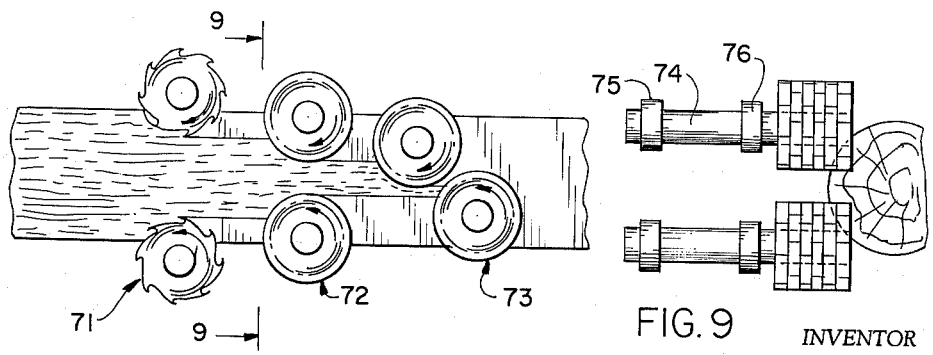

These and other objects of the invention will become apparent from the following description in conjunction with the accompanying drawings, in which:

FIG. 1 is a schematic plan view of apparatus for practicing a phase of the invention;

FIG. 2, an end elevation illustrating the arrangement of a pair of cutter members with respect to the log being fed thereinto;

FIG. 3, a perspective view of one of the cutter members;

FIG. 4, a plan view illustrating the feeding of a cant into apparatus of a further step of the invention;

FIG. 5, an elevation of a pair of the cutters of FIG. 4, illustrating the arrangement of the hold-down and feed rollers;

FIG. 6, a plan view of apparatus for carrying out a further step of the invention;

FIG. 7, an elevation of the horizontal cutter member and anvil of FIG. 6;

FIG. 7A, a section on line 7A—7A of FIG. 7;

FIG. 8, a schematic side elevation of a modification; and

FIG. 9, an end view of a pair of cutters of FIG. 8, illustrating the arrangement with respect to a log.

Briefly stated, the present invention contemplates the employment of side-by-side offset cutting members adapted to engage the side of a log or cant and thereby cut a flat surface or squared edge, thus producing a cant or board for further reduction or sawing, if desired. The cutting edges are so arranged and their rate of operation is so related to the feeding of the log and the depth of cut as described in my copending applications and patent that usable chips are produced during the removal of material from the logs and cants.

In order to illustrate the procedures and apparatus for practicing my invention reference is made to the drawings. In FIG. 1 there is illustrated a log L which is resting on a conveyor chain 10 by which it is fed in the direction indicated into the cutters 11, 12 and 13. From the last cutter 13 the reduced log moves off of the chain 10 and is withdrawn by rollers 14 and 15. The log is held down against chain 10 by a hold-down roller 16 (FIG. 2) mounted on a shaft 17 yieldingly supported in bearings 18 which permit the roller to ride along the top of logs of varying size which it urges downwardly.

Although one or more pairs of cutters may be employed, three are illustrated, such number being adequate for reducing logs or cants having a substantial taper from end to end.

Each of the cutters 11, 12, 13 consists of a multiplicity of stacked disks 20 having an appropriate number of teeth 21 along the periphery. In order to produce separate chips from the contiguous cutting disks, the teeth 21 between adjacent disks must be staggered. The teeth are of a width corresponding to the width of the chip desired according to the requirements of the pulp mill or other use for which they are produced. Such chips, as an example, may be approximately one-quarter to one-half inch wide.

In order to produce elongated chips of the desired size and characteristics, the cutters are operated so that an appropriate number of cuts are made along the log as it is advanced. The essential features of such construction and operation are described in my copending applications and patent, to which reference is made for a description thereof. In order to permit such operation the teeth of the cutting disks of the present invention must have gullets of sufficient size to accommodate the chips without substantial compaction. Instead of cutting disks, the cutters may be formed by other means.

The cutting disks of each cutter are mounted on a shaft 24 supported in suitable bearings 25 and rotated by suitable means such as a motor 26 driving a pulley 27 and a belt 28 driving a pulley 29 mounted on the shaft 24.

In the operation of the device illustrated in FIGS. 1 and 2 a log is fed by the chain into the pairs of cutters 11, 12 and 13. The pairs are spaced apart so that the first pair 11 remove the outermost side portion, the cutters 12 a next inner portion, and the cutters 13 an innermost portion, thereby cutting material from the sides just as though slabs had been removed therefrom. Although the cutters of each pair may be spaced varying distances, it is contemplated that the spacing be appropriate for the size of logs and cants handled and for the production and size of chip required. Hence, the cutter shafts 24 may be mounted so that they may be shifted toward and away from the line of travel of the log. It is contemplated that each cutter will be adjusted for the depth of cut desired, the relationship of cut to the other variables being described in my copending application, Serial No. 179,073. As described in that application, the depth of cut of each cutter is in the range of approximately $\frac{1}{5}$ to $\frac{1}{20}$ of the diameter of the cutter and the rate of feed of the material along the cutters is such that the bite of each tooth is substantially in the range of $\frac{1}{8}$ to 1 inch.

As an example, the cutters 11 might be spaced apart eight inches, the cutters 12 six inches and the cutters 13 four inches. This would permit the reduction of a log of considerable taper. Depending upon the size and taper of the log, the same may be contacted by only one or two of the three pairs of cutters. In ordinary practice a log is reduced or sized to produce the maximum size cant or a cant of a particular size. By arranging the spacing of the cutters the same amount of material may be removed from the log as would ordinarily be removed in slabs.

After the log has passed through the apparatus described it will have two flat side faces as indicated in FIG. 2, the two vertical faces being round.

If it is desired to flatten the two vertical faces the log is turned onto one of the flat surfaces and passed into the second stage of the apparatus indicated in FIGS. 4 and 5. In the apparatus of the second stage the log passes between conventional lower feed rolls 30 and upper hold-down rolls 31, the feed rolls 30 being mounted in fixed bearings 32 and driven by gearing 33 and the hold-down rolls being shiftably mounted in bearings 35, so that it may accommodate logs or cants of varying height. In the second stage, as indicated in FIG. 4, the log is passed between spaced pairs of cutters 36, 37 and 38, whose structure and function are similar to those of cutters 11, 12 and 13 previously described. In passing the last cutters the log has been reduced to a cant C having flat faces and rounded corners.

From the second stage the cant C is passed through a gang edger (not shown) which may be like that described in my aplication Serial No. 179,073, in which it is manufactured into boards, some of which have squared edges and some have rounded edges.

After the cant has passed through the edger, the resulting product is some squared lumber, some with one or more edges requiring squaring and some slabs which are not of a size from which a board may be produced. In order to square the edges of certain lumber and reduce other to chips, such lumber passes to the fourth stage illustrated in FIGS. 6 and 7. In such stage the lumber is fed by conventional feed rolls 30 and hold-down rolls, as previously described, and passes one or more pairs of cutters 46, 47, 48 and beneath a horizontally mounted cutter 50, the vertical spacing of which from the last feed roll 30, which is disposed approximately therebeneath, may be adjusted.

Since the cutters in the fourth stage are for the purpose of removing edging from previously cut boards, such cutters may have a relatively small number of disks as compared to those in previous stages and may not need to be of as rugged construction. In the event that a slab were being processed in this stage, it would be positioned with its flat side downward on the feed roll. Then the cutters 46, 47, 48 would remove the side edging and the horizontal cutter 50 would remove the appropriate amount of the upper portion of the slab. If the slab were too thin or otherwise inappropriate for lumber, the horizontal cutter 50 could be positioned to reduce such slab entirely to chips. In order to maintain the feed of a slab that is being reduced to chip, a lower anvil plate 52 is mounted under the cutter 50 with its upper surface so positioned that the lower surface of the slab will slide therealong, thereby permitting the cutter to reduce such slab entirely to chips by being adjusted in close relationship to the plate.

After passing through the preceding stages the log will have been reduced into boards and chips. However, in order to produce finished lumber of the desired length and having square ends, it is necessary to trim its ends. The material removed, known as lumber trimmings, should desirably be reduced to usable chips in order not to have any unused or waste material. In order to accomplish this, the trimmings may be passed through apparatus such as that described in the previous stage, apparatus being provided for feeding the trimmings into cutters in which the entire mass is reduced to chips.

The foregoing has described one method of procedure and operation of the feeding and cutting mechanism. However, other arrangements may be employed. For example, the cutters in FIGS. 1 and 2 have been described as mounted on vertical axes. However, these may, if desired, be mounted on horizontal axes as illustrated in FIGS. 8 and 9. With reference to FIG. 8, a side elevation, spaced pairs of cutters 71, 72, 73 are mounted on horizontal axes 74 at the side of the log and are supported in spaced bearings 75, 76 as illustrated in FIG. 9. In such arrangement the disks or teeth of the cutters operating innermost of the log must have lateral extent sufficient to cut a path with clearance for such inner disks as in the case of a conventional saw.

Instead of cutting only one side of a log as indicated in FIG. 8, the cutters may be duplicated on the opposite side to remove material from both sides simultaneously.

Similarly, if it is desired to remove material from the upper and lower surfaces at the same time, this may be done by positioning cutters of appropriate width for the removal of such material.

It is understood that the sawmiller may employ the apparatus described or portions of it in various ways. For example, he may saw logs using circular saws and employ apparatus such as that described in step four to reduce the slabs to chips. The sawmiller may desire to use circular head saws but instead of sawing slabs from both sides of the log, leave a pair of sides rounded and reduce these with a cutter such as described in connection with FIGS. 6 and 7. Such procedure would reduce the number of lines or operations cut on the head saws.

Accordingly, it will be understood that the invention contemplates the mounting of one or more pairs of cutter members with their axes parallel and the feeding therebetween of logs, cants and slabs, whereby the latter are reduced along one or more or a succession of surfaces, the material removed being in the form of wood particles or chips. By the selection of cutter members of appropriate physical characteristics, and of the rates of operation thereof and of the feed of material to be reduced with respect thereto, the material may be reduced with a usable by-product resulting from the operation and with the elimination of handling and shifting of slabs normally accompanying sawmilling practices in which whole slabs are sawed and removed. It is understood that the selection of saws having appropriate physical characteristics, including diameter, number of teeth and operating characteristics, including depth of cut, r.p.m. and feed, is described in my copending applications and patent to which reference has been made.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

The method of sawmilling comprising serially feeding a log endwise between spaced pairs of rotary chipping cutter members, forming a cant having four parallel sides and rounded corners, and forming elongated chips as material is removed from the log by arranging the cutter members to remove wood particles from the log along opposite sides thereof, said cutter members comprising individual cutters mounted side by side and with the teeth of contiguous individual cutters offset from each other, arranging said cutters in opposed pairs to cut progressively deeper in the direction of feed of the log, arranging said cutters to cut into the material a depth of approximately ⅕ to ¹⁄₂₀ of the diameter of the cutters and controlling the rate of feed of the log and speed of rotation of the cutter members so that the bite of the teeth of the cutters is substantially in the range of ⅛ to 1 inch, sawing the cant into boards, and removing the round edges of any round edged boards.

References Cited by the Examiner

UNITED STATES PATENTS

| | | | |
|---|---|---|---|
| 1,146,655 | 7/15 | Rodes | 144—312 |
| 1,252,445 | 1/18 | Johansson et al. | 144—312 |
| 1,825,041 | 9/31 | Babare. | |
| 1,842,419 | 1/32 | Morris. | |
| 2,561,746 | 7/51 | Merrill. | |
| 2,582,658 | 1/52 | Tackett. | |
| 2,717,012 | 9/55 | Schneider | 143—52.2 |
| 2,811,183 | 10/57 | Mottet. | |
| 2,812,790 | 11/57 | Stuart | 144—172 |
| 2,819,744 | 1/58 | Chuet et al. | |
| 2,825,371 | 3/58 | Forman. | |
| 2,899,992 | 8/59 | Key. | |
| 2,902,069 | 9/59 | Gentry | 144—3 |
| 2,938,552 | 5/60 | Rogers | 144—3 |
| 3,017,909 | 1/62 | Bowling et al. | 143—157.4 |
| 3,032,084 | 5/62 | Traben | 144—3.14 X |

LESTER M. SWINGLE, *Primary Examiner.*

WILLIAM W. DYER, JR., EARL EMSHWILLER,
*Examiners.*